United States Patent

[11] 3,633,221

[72] Inventors Charles J. Addison
   Bolton;
   Joseph Diemond, Simsbury, both of Conn.
[21] Appl. No. 811,955
[22] Filed Apr. 1, 1969
[45] Patented Jan. 11, 1972
[73] Assignee Coleco Industries, Inc.
   Hartford, Conn.

[54] DECORATED FORMED ARTICLES AND METHOD OF MAKING SAME
7 Claims, 3 Drawing Figs.

[52] U.S. Cl. .................................................... 4/172,
   156/277, 156/290, 161/5, 161/7, 161/148,
   161/227, 161/247, 161/411, 161/413
[51] Int. Cl. .................................................... B32b 7/14,
   B32b 27/32, E04h 3/16
[50] Field of Search .................................................... 4/172;
   150/0.5; 264/94; 156/196, 240, 242, 244, 245,
   277, 278, 290—291; 161/7, 109, 111, 114, 115,
   247, 252, 413, 5, 148, 227, 411, 412; 229/2.5–3.5

[56] References Cited
UNITED STATES PATENTS

| | | | |
|---|---|---|---|
| 1,597,432 | 8/1926 | Conant | 156/290 X |
| 2,675,339 | 4/1954 | Zenftman | 161/191 |
| 2,919,059 | 12/1959 | Sporka | 229/3.5 |
| 3,113,831 | 12/1963 | Coale | 264/94 X |
| 3,251,727 | 5/1966 | Reynolds et al. | 161/148 |
| 3,389,036 | 6/1968 | Rudolph et al. | 161/245 X |
| 3,421,162 | 1/1969 | Diemond et al. | 4/172 |
| 2,477,300 | 7/1949 | Karfiol et al. | 161/120 |
| 3,124,729 | 3/1964 | Ranalli | 161/412 X |
| 3,171,539 | 3/1965 | Holbrook et al. | 161/412 X |
| 3,264,164 | 8/1966 | Jerothe et al. | 161/33 |
| 3,497,877 | 3/1970 | Diemond et al. | 4/172 |

Primary Examiner—Harold Ansher
Assistant Examiner—Henry F. Epstein
Attorney—Peter L. Costas ABSTRACT: A decorated article is formed of a laminate of a sheet material and a film bonded thereto. The film has a decorative pattern on the inner surface thereof, and the elements of the pattern have a multiplicity of discontinuities therein at which the sheet material and film are in surface contact and bonded together.

PATENTED JAN 11 1972

3,633,221

CHARLES J. ADDISON, INVENTORS
JOSEPH DIEMOND

BY Peter L. Costas

Attorney

DECORATED FORMED ARTICLES AND METHOD OF MAKING SAME

BACKGROUND OF THE INVENTION

Although surfaces of plastic articles may be decorated by painting or printing a pattern or design directly on them, that practice is not desirable in some cases such as where the decorated surface is subjected to a significant amount of wear or is exposed to weather, water or other deteriorating elements. One method of protecting the printed pattern against wear and deterioration is to form a laminate of the article with a transparent overlay film so that the printed design is sandwiched therebetween and protected by the overlay film. However, whereas the design may be printed on one of the surfaces of the laminate elements with a good adhesion by the use of a solvent which etches or otherwise treats the surface to provide a good bond with the resin or pigment of the printing ink, once the ink composition has dried it may become relatively nonadherent to the surface of the other element. As a result, there is a strong tendency for delamination of such structures to occur, particularly during subsequent thermoforming operations and when the article produced is subjected to rough or heavy use and/or a deteriorating environment, such as is the case with children's toys, plastic swimming pools, and the like.

Accordingly, it is an object of the present invention to provide a decorated, laminated, thermoformed article wherein the decoration is protected against wear and removal and wherein a good bond is formed between the layers of the article within the decorated portions to lessen or avoid any tendency for delamination.

It is also a specific object of the invention to provide such an article wherein the layers thereof are fabricated of an olefin polymer.

Another object is to provide a simple and facile method by which the decorated surface of an overlay film may be bonded to a sheet material element and by which the resultant laminate can be thermoformed without substantial delamination.

SUMMARY OF THE INVENTION

It has now been found that the foregoing and related objects can be readily attained in a decorated, thermoformed article comprising a laminate of thermoplastic polymer sheet material to which is bonded a thermoplastic polymer film having at least one decorative pattern element of an ink composition on the surface thereof adjacent the sheet material. The pattern element has a multiplicity of discontinuities therein spaced about substantially the entire surface thereof, and at which the sheet material and film are in surface contact and bonded together. The smallest dimension of each of the discontinuities in about one sixty-fourth to one-fourth inch, and the total void area defined by the discontinuities is about 4.0 to 50.0 percent of the total area of the pattern element.

Preferably, the smallest dimension of each of the discontinuities is about one thirty-second to one-eighth inch and the total void area of the discontinuities in a pattern element is about 6.0 to 20.0 percent of the total area thereof. The discontinuities may be of discrete circular configurations or dots having a diameter of about one thirty-second to one-eighth inch, and most desirably the discontinuities are in a staggered pattern to resist peeling of the film along substantially any radius of substantially any of the discontinuities.

In various embodiments of the invention, the thermoplastic polymers are olefin polymers, and more specifically polyethylene, and the film is surface-treated to enhance its bonding properties to the ink composition and to the sheet material. The sheet material may desirably be about 15–300-mils-thick, and the laminate may be thermoformed to produce a swimming pool or the like having a bottom wall and a sidewall extending thereabout.

In the method of the invention used to produce a decorated, laminated article, the first step involves the application of an ink composition to one surface of a film of thermoplastic polymer to provide a decorated film having at least one element; a multiplicity of discontinuities are spaced about substantially the entire surface thereof, and the minimum dimension and total void area provided by all of the discontinuities are as previously described. The printed surface of the decorated film so produced is thereafter brought into contact with a sheet material of a thermoplastic polymer, and the film and sheet material are laminated under conditions of heat and pressure sufficient to cause the thermoplastic polymer of at least one of the film and sheet material to flow through the pattern discontinuities to contact the other of those elements and bond therewith to form a laminate. The laminate may thereafter be thermoformed to produce an article.

The sheet material may be extruded at an elevated temperature at or above the molten temperature of the thermoplastic polymer thereof, and the decorated film may be positioned there adjacent before the sheet material cools below its molten temperature so as to utilize the heat thereof in the laminating step. Continuous lengths of decorated film and sheet materials are laminated in accordance with one embodiment of the invention by continuously contacting the decorated film with the sheet material as a result of feeding continuous lengths thereof in the proper relationship simultaneously through the nip of a set of pressure rolls.

DETAILED DESCRIPTION OF THE ILLUSTRATED EMBODIMENT

Figure 1:
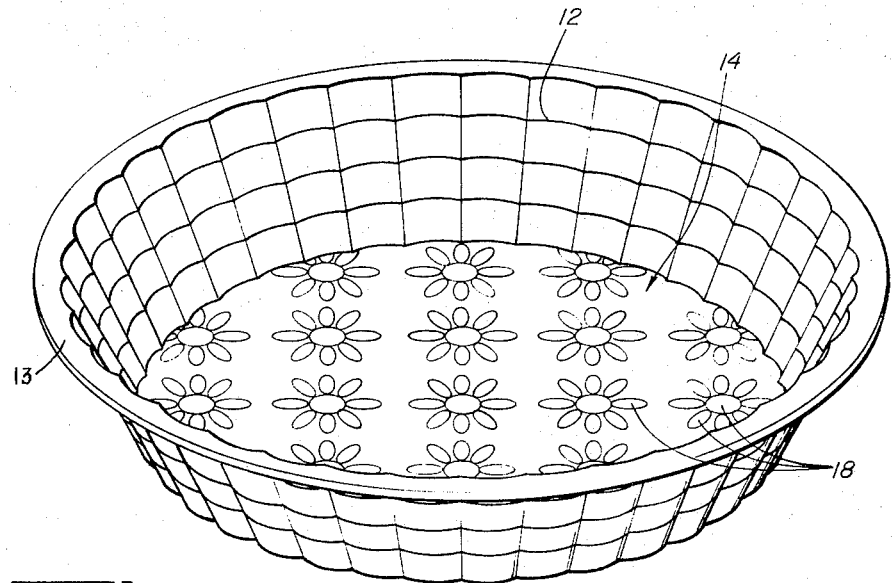
FIG. 1 is a perspective view of a swimming pool having a decorative overlay film bonded to the inside surface of the bottom wall thereof.

Turning now in detail to FIG. 1 of the appended drawing, a thermoformed plastic swimming pool has a bottom wall generally designated by the numeral 10 and an integrally formed sidewall 12 extending about the periphery thereof with a peripheral flange 13 about the upper edge thereof. A decorative overlay film, generally designated by the numeral 14, is bonded upon the inside surface of the swimming pool; although the overlay film 14 is shown covering only the bottom wall 10, this is done for ease of illustration, and in practice the overlay 14 will normally extend up the sidewall 12 and outwardly over the peripheral flange 13.

Figure 2:
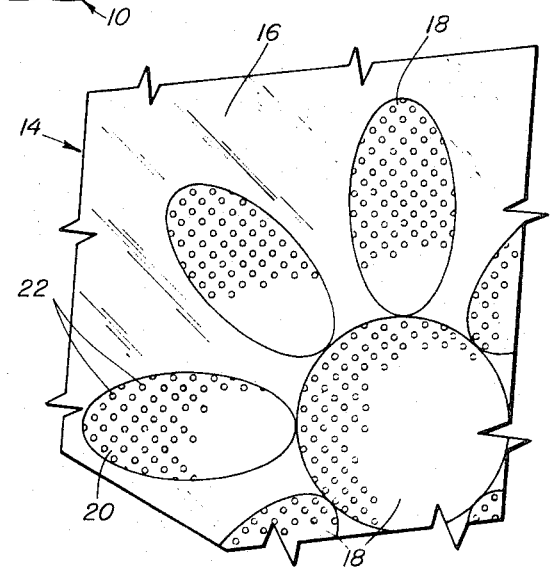
FIG. 2 is a fragmentary bottom view of a section of a decorated film which may be bonded to sheet material to form a laminate which can be thermoformed to produce the swimming pool of FIG. 1, and to an enlarged scale from that of FIG. 1 to illustrate the discontinuities in the pattern elements.

FIG. 2 shows the bottom surface of the decorative overlay film 14 which consists of a transparent thermoplastic film 16 with an ink composition 20 printed thereon to form a plurality of pattern elements 18. The pattern elements 18 have a multiplicity of circular holes or discontinuities 22 disposed therein and spaced abut substantially the entire surface thereof (although, for simplicity, the figure actually shows the holes 22 over only a portion of the surface of the pattern elements 18).

Figure 3:
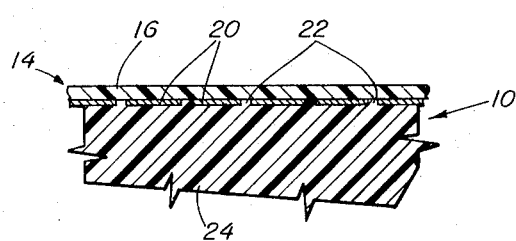
FIG. 3 is a fragmentary elevational section view to a greatly enlarged scale of a laminate of a decorated thermoplastic polymer film bonded to a thermoplastic polymer sheet material.

As is seen in FIG. 3, the overlay film 14 is bonded to a thermoplastic base element 24 with the ink composition 20 sandwiched therebetween to provide a laminate suitable for thermoforming such as to produce the swimming pool illustrated in FIG. 1. The adjacent inner surfaces of the film 16 and base element 24 are in direct contact at the areas of discontinuity 22, and plastic material has flowed therethrough to create the bond necessary to produce the laminated structure.

A swimming pool is used as the illustrated embodiment because the problems to which the present invention is directed are quite pronounced therein. Thus, in thermoforming such a swimming pool from a laminate in which bonding of the elements is insufficient, there is a strong tendency for delamination to result, particularly at the points of stress which would occur during the drawing of the sidewall areas thereof. Moreover, such an article is subjected to scuffing and abrasion by the persons using it, and the water with which it is filled has a tendency to seep under the film so as to destroy the bond and cause separation of the layers. However, it should be appreciated that the present invention is by no means limited to swimming pools, and may be equally beneficially applied to other articles, such as sandboxes, sleds, rocking toys, punching bags, doll houses, receptacles, etc., when such articles are fabricated of plastic.

The discontinuities disposed within the pattern elements may be circular, as illustrated, or of any other desired geometric shape; although they will normally be discrete, i.e., each individually formed and surrounded by ink composition, they may be interconnected and may, for example, be in the form of a series of thin lines or stripes which may be disposed parallel or perpendicular to one another, or in a crisscrossed configuration which will render the printed areas discrete rather than the discontinuities.

To accomplish the objects of the invention, it is important that the minimum dimension of each discontinuity be within the range of about one sixty-fourth to one-fourth of an inch. Since the presence of the discontinuities will be objectionable in some cases from an aesthetic standpoint if they are too large, the minimum dimension of each of the discontinuities will preferably be no greater than about one-eighth, and most desirably three thirty-seconds of an inch. If the minimum dimension is smaller than about one sixty-fourth of an inch the ink tends to fill them and reduce their size or completely obliterate them, thereby diminishing the level of bond strength. For this reason it is generally preferred that the minimum dimension be no less than about one thirty-second of an inch, but this will depend somewhat upon the flow characteristics of the printing composition under the conditions of operation.

The distance between adjacent discontinuities must be small enough so that no unduly large continuous areas of ink are present, such as would tend to lower the bond strength to an undesirable level, and yet not so small as to interfere with the pattern design. Generally, if the spacing and dimensions of the discontinuities are chosen so that the total void area of all of the discontinuities within a given pattern element is about 4.0 to 50.0 percent of the total area thereof, the level of adherence will be adequate and the pattern will be sufficiently appealing. Preferably, however, the discontinuities will constitute an area of about 6.0 to 20.0 percent of the total area covered by a pattern element. When, for example, the discontinuities are provided as dots or small circles within the specified preferred range of minimum dimensions, spacing their centers about one-eighth to one-half inch apart will generally result in pattern elements having the preferred percentage of total void.

It is most preferred to arrange the discontinuities within a pattern element in a design which will provide multiaxial peel strength. Thus, a discontinuity should be present along any axis emanating from any particular discontinuity and reasonably close thereto, i.e., within the adjacent two or three rows of discontinuities. The particular arrangement necessary to achieve this objective will depend upon the configuration of the discontinuities themselves, but the design and relative spacing illustrated in FIG. 2 of the appended drawing suggests one suitable pattern.

Within the plastics and packaging industries the term "film" is employed to describe sheet material which is less than 10 mils in thickness, and the thermoplastic films employed in accordance with the present invention should conform to that definition; preferably, they should be about 0.2–0.8 mil-thick. They should be relatively durable and tough to provide the protection which is desired, and may, for example, be provided by an olefin polymer or copolymer; e.g., ethylene, polypropylene, ethylene/propylene copolymer, and ethylene/vinyl acetate copolymer. Also suitable for use are materials classified as "ionomers," which have been defined as thermoplastics having polyethylene as their major component and containing covalent and ionic bonds. A specific example of an ionomer which is suitable for use is the polyethylene composition containing metallic ions sold by E. I. du Pont de Nemours & Co. under the trademark Surlyn A.

Unless suitably modified, olefin homopolymers are generally nonpolar, nonporous and quite inert. As a result, it is difficult to bond them to other materials, particularly ink compositions and to other polyolefin surfaces, unless the surfaces are modified to render them more adherent such as by an oxidizing flame or by treatment with a suitable acid, solvent, or high voltage electrostatic treatment. It is believed that such treatments alter the physical structure of the polyolefin surfaces to modify the chemical and flow characteristics thereof and facilitate the formation of polar bonds to render them more adherent to one another as well as to other materials such as ink compositions and the like.

The ink which is used, and preferably applied to the film, will be any which is suitable for printing upon the specific thermoplastic polymer involved. Normally, a fast-drying flexographic or gravure-type of ink composition will be employed such as, for example, the polyamide resin/alcohol solvent inks which are commercially available for those purposes. The ink should have a solvent component which is capable of etching the surface of the polymer, if necessary, to enhance the bond with the resin or pigment of the ink. Since it is not generally feasible to produce the laminate before the ink composition dries, and the dried ink compositions are generally substantially nonadherent to the polymer surface, provision must be made for bonding within the printed areas; this gives rise to the problem for which the present invention provides a desirable solution.

The base element, or sheet material, to which the film is bonded may be of the same or of a different thermoplastic polymer than that from which the film is fabricated so long as they are sufficiently compatible to be bonded by heat and pressure, and the foregoing description of exemplary suitable types of polymers is equally applicable to the sheet material. The term "sheet material," as employed herein is intended to encompass not only the films as previously defined, but also sheets which are relatively thick, i.e., 10 mils or thicker. In most applications the thickness of the sheet material will be about 15 to 300 mils, and preferably the sheet material will range between about 60 and 120 mils in thickness, such as when the laminated article is a swimming pool structure.

The lamination of the film and sheet material is effected under sufficient heat and pressure to cause the material of one, and most desirably both, of the layers to flow, and the surface treatments previously discussed may enhance that effect in some cases. As a result, the polymer from one or both of the elements of the assembly will flow into the discontinuities within the pattern element so that the layers are bought into surface contact thereat.

The heat necessary to achieve the elevated temperatures at which the thermoplastic polymers are molten or sufficiently fluid under pressure may be provided from any suitable source, such as heated rolls, a radiant heating element, or the like, and the layers of the laminate can be heated before or after the two elements are brought into contact. One particularly desirable technique for bonding the film to a sheet material which is extruded is to contact the film with the extruded sheet directly or shortly after it exits from the extruder, or at least prior to the time at which it has cooled to a temperature below its molten point or to a point at which it is no longer fluid at the laminating pressure. Thereafter pressure is simply applied to the two layers, such as by passing them through pressure rolls to form the laminate, the heat required being furnished, at least in part, by the residual heat energy of the sheet material. If the heat of the sheet material is insufficient for good bonding, heated pressure rolls may be used, and they may be desirable in any case to avoid premature cooling of the assembly.

In a typical situation utilizing a decorated polyethylene film and polyethylene sheet material, the film may be continuously applied to a molten extrudate providing the sheet material immediately after the latter exits from the extrusion die, the decorated or printed surface of the film being placed against the extrudate. The two layers may then be passed directly into the nip of heated, polished pressure rolls and ultimately through a cooling zone to produce the laminate continuously. In such a case, the extrusion die may be at a temperature of about 400° to 450° Fahrenheit and the heated rolls at about 200° to 300° Fahrenheit to prevent premature cooling and lack of adequate adhesion. Alternatively, the film may be separately heated, the sheet material may be preformed and subsequently heated, and the lamination may be effected piece-by-piece.

Normally, the laminated sheet will be thermoformed subsequent to its production into any of numerous articles. The methods for thermoforming such articles are well-known in the art and include techniques wherein different pressures are created on opposite sides to conform the laminate to the shape of a mold or die, such as in vacuum forming, drape forming, positive pressure forming, matched mold forming, and the like. The method best used for thermoforming the laminates into a particular article will depend primarily upon the specific thermoplastic polymers which are involved, the physical characteristics of the laminate and the shape of the article, as is well-known in the art. In certain forming methods, the laminate will be drawn, as a result of which the pattern will become distorted in the areas where the sheet material is stretched. This effect can be compensated for by configuring the pattern so that it will have the desired appearance after the drawing operation, or in some cases the effect can be ignored. It is also possible to limit the pattern elements to areas of the laminate which are not to be drawn to a reduced thickness.

Thus, it can be seen that the present invention provides a decorated, laminated, thermoformed article, which may be fabricated of an olefin polymer. The decorative pattern is protected against wear and removal, and a good bond is formed between the layers of the article within the decorated portions to lessen or avoid any tendency for delamination. The invention also provides a simple and facile method by which the decorated surface of an overlay film can be bonded to a sheet material element and by which the resultant laminate can be thermoformed without substantial delamination.

Having thus described the invention, we claim:

1. A decorated, thermoformed article comprising a laminate of a thermoplastic polymer sheet material and a thermoplastic polymer film bonded thereto by heat and pressure, said film having at least one decorative pattern element of an ink composition on the surface thereof adjacent said sheet material and substantially nonadherent to said sheet material, said pattern element having a multiplicity of discrete discontinuities therein each surrounded by said ink composition and spaced about substantially the entire surface thereof and through which said sheet material and film are in direct surface contact and substantially permanently bonded together by heat and pressure, the smallest dimension of each of said discontinuities being about one thirty-second to one-fourth inch, the total void area defined by said discontinuities being about 4.0 to 50.0 percent of the total area of said pattern element, said thermoformed article having at least one wall portion extending at an angle to other portions thereof.

2. The article of claim 1 wherein said discontinuities are of discrete circular configuration having a diameter of about one thirty-second to one-eighth inch and wherein said total void area is about 6.0 to 20.0 percent of the total area of said pattern element.

3. The article of claim 2 wherein said discontinuities are in a staggered pattern to resist peeling of said film along substantially any radius of substantially any of said discontinuities.

4. The article of claim 2 wherein said thermoplastic polymers are ethylene polymers.

5. The article of claim 4 wherein said film is surface treated to enhance the bond with said ink composition and sheet material.

6. The article of claim 1 wherein said sheet material is about 15–300-mils-thick.

7. The article of claim 6 wherein said article is a swimming pool or the like having a bottom wall and a sidewall extending thereabout.

* * * * *